United States Patent Office 3,235,570
Patented Feb. 15, 1966

3,235,570
EPOXIDATION OF UNSATURATED COMPOUNDS
Benjamin Phillips and Paul S. Starcher, Charleston, and Donald L. MacPeek, South Charleston, W. Va., assignors to Union Carbide Corporation, a corporation of New York
No Drawing. Filed Apr. 10, 1962, Ser. No. 186,328
3 Claims. (Cl. 260—348)

This invention relates to the preparation of glycidic esters. In one aspect, the invention relates to diepoxides of alkadienoate esters wherein one of the oxirane oxygen atoms therein is bonded to the alpha, beta-carbon atoms of the carboxylic acid moiety.

This application is a continuation-in-part of application Serial No. 798,835 entitled Epoxidation of Unsaturated Compounds, by B. Phillips et al., filed March 12, 1959, now Patent No. 3,141,027, which in turn is a continuation-in-part of application Serial No. 696,043, entitled Epoxidation of Unsaturated Compounds, by B. Phillips et al., filed November 13, 1957, now abandoned, both of said applications being assigned to the same assignee as the instant application.

The synthesis of certain types of glycidic esters, i.e., 2,3-epoxy esters, are well known in the art. In 1892, Erlenmeyer produced ethyl $\beta$-phenyl-$\alpha,\beta$-epoxypropionate by the interaction of benzaldehyde and ethyl chloroacetate in the presence of sodium. Between 1904 and 1932 Erlenmeyer's work was expanded by Darzens who generally favored the use of sodium ethoxide as the condensing agent. A modification by Darzens of his general procedure was the reaction of ketones or aldehydes with ethyl dichloroacetate and dilute magnesium amalgam, followed by hydrolysis of the product to produce $\beta$-hydroxy-$\alpha$-chloroester. Treatment with sodium ethoxide provided the glycidic esters. The disadvantages of the Darzens process include small yields, undesirable side reactions, wide boiling point range, e.g., 5° to 10° C., of many reported glycidic esters indicating the presence of impurities such as isomeric carbon or oxygen alkylation products, recommended use of an inert atmosphere, economic barriers presented by the high cost of starting materials, and others.

The reaction with methyl sorbate and perbenzoic acid in chloroform over a period of from about 5 to 10 days gave only methyl 4,5-epoxy-2-hexenoate and not the 2,3-epoxy or glycidic type of ester. Another method reported in the literature involved the reaction of methyl crotonate and perbenzoic acid to prepare methyl 2,3-epoxybutyrate. A yield of 44 percent was obtained by a procedure involving a reaction period of several months at 8° C. in the absence of light. A recent work reported the epoxidation of the acrylate, of the $\alpha$-methylacrylate, and of the crotonate esters by the use of the prohibitively expensive peroxytrifluoroacetic acid in a system buffered with disodium hydrogen phosphate. Almost universally a solvent such as methylene chloride or ethylene dichloride was required to minimize olefin polymerization.

The work of several investigators was summarized by Swern (Chem. Rev., 45, 50–51) in 1949 with respect to the epoxidation of alpha,beta-unsaturated esters with perbenzoic acid. His conclusions stated that the reaction of perbenzoic acid with an olefin bearing a carbonyl or carboalkoxy (—COOR) group in close proximity to the ethylenic bond was either slowed down to an exaggerated degree or prohibited by the presence of that group.

The invention contemplates the preparation of novel glycidic esters via the peracetic acid epoxidation route of an alkadienoate ester which possesses one double bond in the 2-position of the carboxylic acid moiety, said ester having the following formula:

(I) 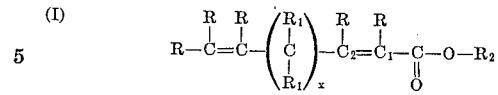

wherein each R, individually, can be a hydrogen atom or a hydrocarbon group such as alkyl, cycloalkyl, aryl, alkaryl, or an aralkyl radical; wherein $R_2$ is a hydrocarbon group free of aliphatic and cycloaliphatic unsaturation such as alkyl, aryl, alkaryl, cycloalkyl, or an aralkyl radical; wherein each $R_1$, individually, is a hydrogen atom or an alkyl radical such as methyl, ethyl, propyl, butyl, hexyl, and the like; and wherein $x$ is an integer from 0 to 12 inclusive, and preferably from 0 to 4 inclusive. Illustrative radicals for R and $R_2$ include methyl, ethyl, propyl, butyl, isobutyl, amyl, hexyl, 2-ethylhexyl, isohexyl, n-octyl, 3-methyloctyl, cyclohexyl, phenyl, benzyl, tolyl, phenethyl, phenylpropyl, and the like.

Typical alkadienoate esters which are epoxidized at both carbon to carbon double bond sites include methyl $\alpha,\gamma$-pentadienoate, butyl $\alpha,\gamma$-pentadienoate, ethyl $\alpha$-methyl $\alpha,\gamma$-pentadienoate, butyl $\alpha,\gamma$-diethyl-$\alpha,\gamma$-pentadienoate, methyl $\alpha$-phenyl-$\alpha,\gamma$-hexadienoate, benzyl $\gamma$-propyl-$\alpha,\gamma$-hexadienoate, tolyl $\beta$-phenethyl-$\gamma$-methyl-$\alpha,\gamma$-heptadienoate, butyl 3-methyl-$\alpha,\delta$-heptadienoate, and the like.

The novel glycidic esters are characterized by the structural formula depicted below:

(II) 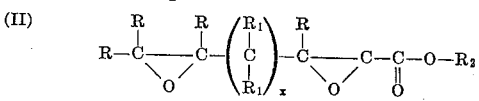

wherein the R, $R_1$, $R_2$, and $x$ variables have the values assigned to them in Formula I supra. Illustrative novel diepoxide esters include methyl 2,3-4,5-diepoxyvalerate, butyl 2,3-4,5-diepoxyvalerate, ethyl 2-methyl-2,3-4,5-diepoxyvalerate, methyl 2-phenyl-2,3-4,5-diepoxyhexanoate, benzyl 4-propyl-2,3-4,5-diepoxyhexanoate, butyl 3-methyl-2,3-5,6-diepoxyheptanoate, tolyl 3-phenethyl-4-methyl-2,3-4,5-diepoxyheptanoate, and the like.

The epoxidation reaction can be conducted at a temperature in the range of from about 0° to about 100° C., and preferably from about 25° to about 90° C. As a practical matter, the choice of the particular temperature at which to effect the epoxidation reaction depends, to an extent, on the nature of the alkadienoate ester reagent.

In general, the reaction time will vary depending on the concentration of the reactants, the particular alkadienoate ester employed, the temperature, the type and degree of agitation of the reaction mixture, and other considerations. The reaction time can be as short as minutes in length or it can be as long as 12 hours or more, e.g., from about 30 minutes to about 18 hours.

It is desirable to conduct the epoxidation reaction with equipment which will not foster the polymerization of the alkadienoate ester or catalyze the decomposition of peracetic acid. Equipment constructed of glass, stainless steel, aluminum and the like has been shown to be adequate for this purpose. If desired, a polymerization inhibitor or retarder such as hydroquinone, 2,4-dinitrophenol, 2,4-dinitro-m-cresol, and the like can be incorporated into the reaction mixture in an amount sufficient to prevent possible polymerization of the alkadienoate ester reagent. Provision can be made for heating and/or cooling the reactor contents. A suitable reflux-type condenser can be attached as an integral part of the equipment.

The particular manner of adding the reagents, i.e., the alkadienoate ester and peracetic acid, to the reaction vessel is not narrowly critical. One desirable procedure is to charge the alkadienoate ester to the reaction vessel and subsequently heat said ester to a predetermined temperature. At this temperature, and generally under constant agitation, peracetic acid, preferably in an inert organic medium such as ethyl acetate, acetone, and the like, is fed to the reaction vessel. Cooling is provided, if necessary, to compensate for the heat generated by the reaction. When the epoxidation reaction has gone to substantial completion or as far as desired, the reaction mixture can be separated into its various components, such as, by fractional distillation.

The use of an inert organic medium is not a prerequisite in the epoxidation reaction. However, it has been observed that a faster and cleaner reaction is effected by employing the peracetic acid in an inert organic medium such as ethyl acetate, acetone, and the like. A solution comprising from about 10 to 50 weight percent of peracetic acid, based on the total weight of peracetic acid and inert organic medium, is satisfactory; from about 20 to 40 weight percent of peracetic acid, based on the solution weight, is preferred. Theoretically, to effect substantially complete epoxidation of the alkadienoate ester, at least a stoichiometric quantity of peracetic acid per carbon to carbon double bond of the alkadienoate ester should be employed. Generally, an excess of the stoichiometric quantity of peracetic acid is desirable; however, in those cases wherein an excess of alkadienoate ester in desirable, i.e., less than a stoichiometric quantity of peracetic acid per carbon to carbon double bond of the ester, the excess alkadienoate ester can be recovered by either washing out the acetic acid by-product or by careful fractionation. Such recovered material may be recycled, further increasing the efficiency of the epoxidation process.

It is apparent from a consideration of this specification that the relative ease in which glycidic ester products result from the instant epoxidation reaction between peracetic acid and alkadienoate ester reagent is indeed surprising. According to various authorities and experts in the epoxy field such as Swern, supra, the epoxidation of an alpha, beta-olefinic ester, i.e., an ester wherein a double bond is conjugated with a carbonyl group on the carboxylic acid portion of the ester molecule, with an epoxidizing agent such as perbenzoic acid is effected with extreme difficulty, if at all. The successful epoxidation process afforded by the practice of the instant invention is completely unpredictable on the basis of information available in the literature. The laborious and arduous routes pursued by several skilled chemists in the epoxy field to effect the introduction of oxirane oxygen at the site of the alpha, beta double bond which is in conjugation with a carbonyl group is testimony lending to the unpredictability or the extreme difficulty encountered by a direct epoxidation route, i.e., a single-step epoxidation process. The instant invention, it is submitted, constitutes a definite and patentable advance in the epoxy art.

The advantages of the instant process are readily apparent from the single-step nature of the operation. In addition, an economic source of epoxide oxygen is utilized, i.e., peracetic acid, rather than expensive haloacetates and difficultly handled agents such as sodium amide or other prohibitively expensive peroxygen chemicals such as perbenzoic acid or peroxytrifluoroacetic acid.

The novel glycidic esters of the invention are a useful class of compounds. They can be hydrolyzed to glycidic acids as illustrated by the following equation:

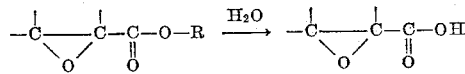

The utility of the glycidic acids is well recognized in the literature and by those skilled in the art. Decarboxylation of the resulting glycidic acids usually yields ketones or aldehydes depending upon whether the alpha substituent (on the alpha carbon atom of the glycidic acid) is a hydrogen atom or an alkyl radical. Glycidic esters, also, can undergo rearrangement to alpha- or beta- keto acids upon heating to an elevated temperature. Depending on the reaction conditions, glycidic esters can yield glycidic amides, hydroxy amino esters, or hydroxy amino amides on treatment with ammonia or amines.

The novel glycidic esters can be reacted, at elevated temperatures, with organic hardeners such as aliphatic polyfunctional amines, e.g., diethylenetriamine, triethylenetetramine, etc., in a ratio so as to provide, for example, one amino hydrogen of said polyfunctional amine per epoxy group,

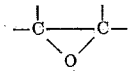

of glycidic ester to thus form useful resins having utility in the molding, adhesive, etc., arts. Other organic hardeners such as polycarboxylic acids, and their anhydrides, e.g., phthalic acid, phthalic anhydride, tetrahydrophthalic anhydride, pyromellitic anhydride, maleic anhydride, and others can also be employed.

The following examples are illustrative.

*Example I*

(A) A solution of peracetic acid (328 grams, 4.3 moles) in ethyl acetate was fed to methyl sorbate (204 grams, 1.44 moles) with vigorous stirring at 85° C. during 2.5 hours. The exothermic nature of the reaction was such that, to maintain this temperature, slight cooling was required during the first hour and slight heating during the last hour of reaction. After the addition was complete the reaction mixture was boiled for an additional two hours and cooled, at which time titration for peracetic acid indicated that more than the theoretical amount was consumed. Acetic acid and ethyl acetate were separated from the reaction mixture by azeotropic distillation with refluxing ethylbenzene. Fractionation of the residue gave 108 grams of methyl 2,3-4,5-diepoxyhexanoate. The properties were as follows:

Boiling range_____ 50°–98° C./0.35–0.80 mm. of Hg.
$n_D^{30}$_____ 1.4543–1.4548.

A fraction having a boiling range of 75°–98° C./0.4 mm. of Hg possessed the following properties:

$n_D^{30}$ _____ 1.4543
Saponification equivalent:
    Found _____ 158
    Theoretical _____ 158

The yield was 43 percent of the theoretical.

(B) In an analogous manner as above, when cyclohexyl sorbate is employed in lieu of methyl sorbate, there is obtained cyclohexyl 2,3-4,5-diepoxyhexanoate.

*Example II*

(A) In a manner identical to that employed is Example IA, ethyl sorbate was treated with an excess of peracetic acid in a 3.0/1.0 molar ratio of peracid to olefin at 80°–85° C. After a five hour reaction period, crude ethyl 2,3-4,5-diepoxyhexanoate was obtained by distillation. The properties were as follows:

Boiling range_____ 52°–70° C./0.2–0.7 mm. of Hg.
$n_D^{30}$_____ 1.4528–1.4460.

The yield was 41 percent of the theoretical.

(B) In an analogous manner as above, when n-butyl 2,5-octadienoate is employed in lieu of ethyl sorbate, there is obtained n-butyl 2,3–5,6-diepoxyoctanoate.

It is obvious that various modifications of this invention can be made by those skilled in the art without departing from the spirit and scope thereof.

What is claimed is:

1. The diepoxy compound comprising an alkane chain having up to 12 carbon atoms, having two vicinal epoxy groups disposed on said chain, one of said epoxy groups including the alpha and beta carbon atoms and the other epoxy group including the gamma and delta carbon atoms, and having attached to the alpha carbon atom of the chain the monovalent radical

wherein R is alkyl having up to 8 carbon atoms.
2. Methyl 2,3-4,5-diepoxyhexanoate.
3. Ethyl 2,3-4,5-diepoxyhexanoate.

No references cited.

WALTER A. MODANCE, *Primary Examiner.*
IRVING MARCUS, *Examiner.*